Patented Jan. 6, 1931

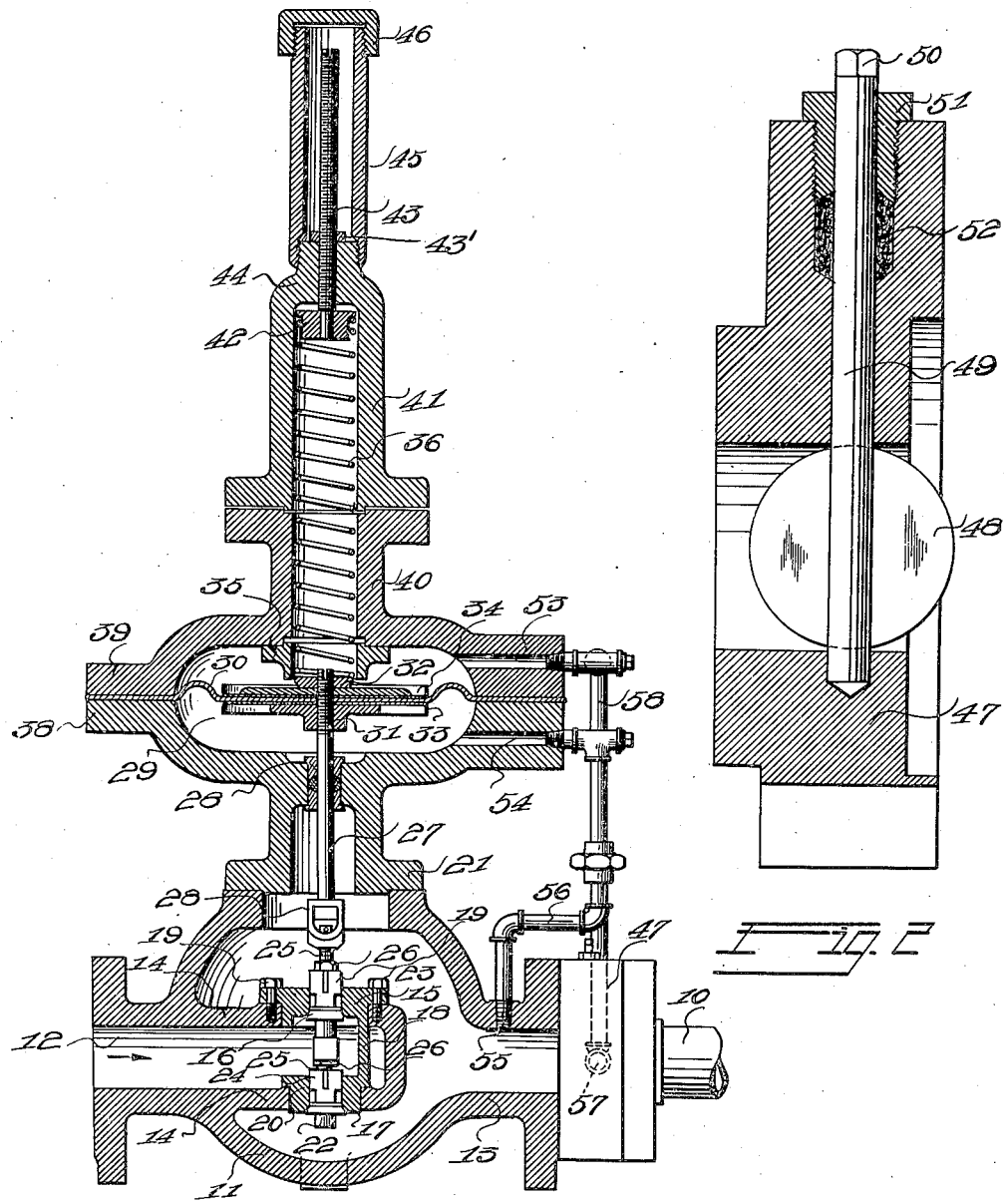

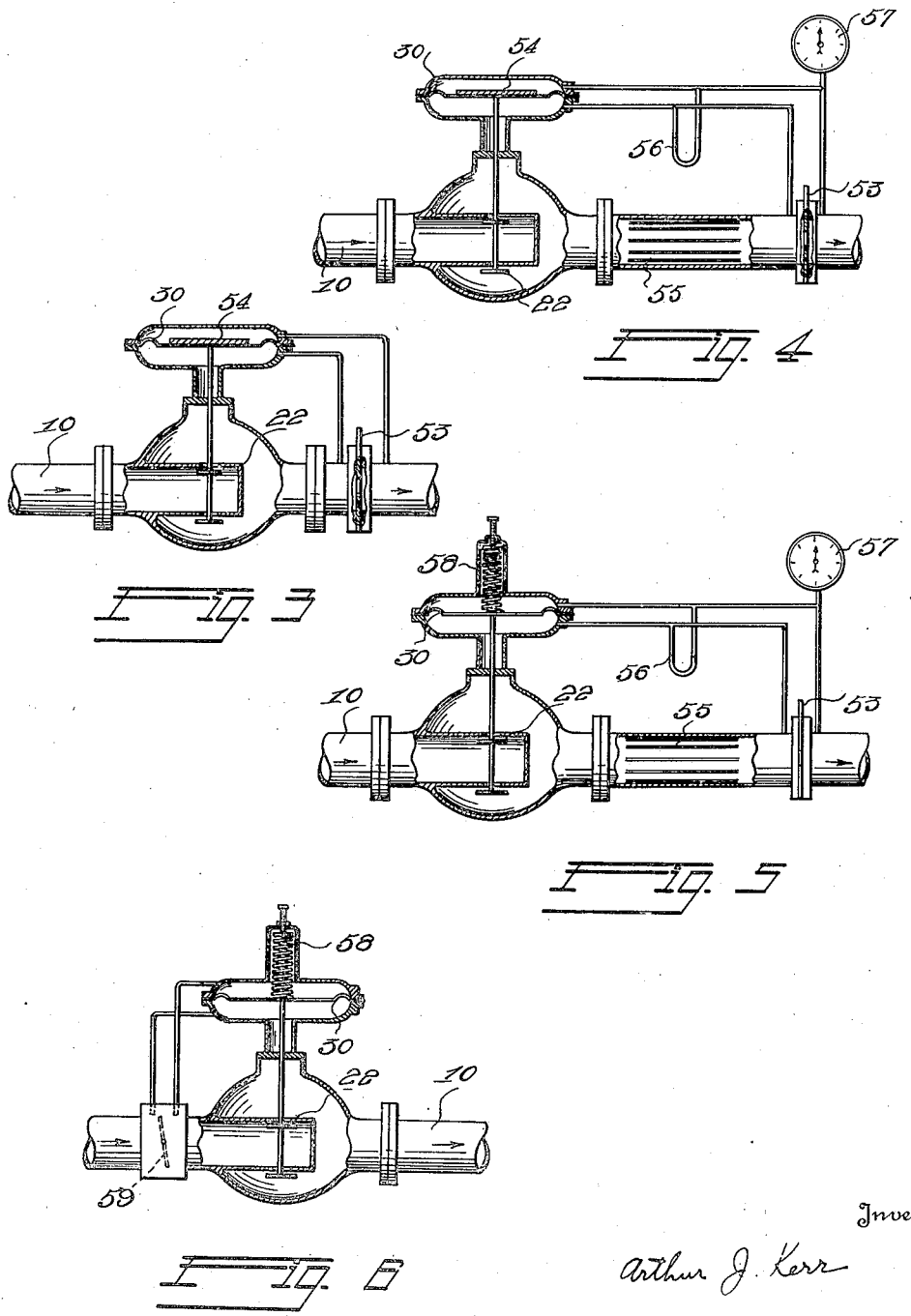

1,787,686

UNITED STATES PATENT OFFICE

ARTHUR J. KERR, OF TULSA, OKLAHOMA, ASSIGNOR TO PITTSBURGH EQUITABLE METER COMPANY, OF PITTSBURGH, PENNSYLVANIA

FLOW-CONTROLLING VALVE

Application filed February 23, 1927. Serial No. 170,388.

The present invention relates to a valve for automatically controlling the flow of gases or liquids through a conduit.

It is frequently necessary or desirable to maintain a constant or substantially constant volume of flow through a conduit in spite of any fluctuations in the supply pressure or in spite of variations in resistance encountered by the flowing medium. When a constant volume of a liquid flows through a conduit including a restriction the differential pressure across the restriction is constant. In the case of liquids, variations in volume of flow produce variations in differential pressure that are proportional to each other. The same is true of gases if the pressure is maintained constant. An object of the present invention is to provide valve mechanisms that respond to fluctuations in differential pressure across an orifice in a conduit. As the volume of flow in the conduit varies, the valve mechanisms will be automatically shifted to increase or diminish the rate of flow.

Another object of the invention is to provide a flow controlling valve operated by differential pressure across a restriction or orifice embodying means whereby fluctuations in volume of flow may be permitted within limits that may be readily varied by simple adjustments.

Still another object of the invention is to provide a flow controller including readily adjustable means to vary the differential pressure affecting a diaphragm that actuates a valve to control the flow of fluids through a conduit.

A further object of the invention is to provide an automatic flow controller embodying means whereby the rate of flow may be computed or recorded.

Still further objects of the invention will appear as the description proceeds with reference to the accompanying drawings in which, Figure 1 is a vertical section of the preferred form of flow controller.

Figure 2 is a sectional view through the preferred flow restricting means.

Figures 3, 4, 5 and 6 show more or less diagrammatically modifications of the invention.

Like numerals indicate like parts throughout the several views.

In the drawings, 10 indicates a conduit through which a uniform volume of flow is desired and in which valve casing 11 is disposed. Casing 11 includes an inlet 12, an outlet 13, and walls 14 separating the inlet from the outlet. A valve cage 15 embodying spaced valve seats 16 and 17 connected together by a web 18 is bolted to one of the walls 14 by bolts 19. It will be observed that the portion of the cage having seat 17 is reduced in diameter providing a seat 20 for the cage. Cage 15 may readily be removed when the head 21 thereof and bolts 19 are removed.

A valve 22 having portions 23 and 24 to seat on seats 16 and 17 of cage 15 controls the flow of fluid through conduit 10. Portion 24 has a threaded stem 25 projecting through a threaded socket in portion 23 to permit adjustment of the valve portions accurately to their seats. Lock nuts 26 hold the portions in properly adjusted relation.

A valve operating rod 27 having a head 28 provided with a threaded bore is connected to stem 25 and extends through a packing gland 28' into a chamber 29 formed in head 21. A flexible diaphragm 30 divides chamber 29 into two parts. Rod 27 has its upper end threaded. Upon this end abutments 31 and 32 are adjustably threaded clamping the midportion of the diaphragm and its supporting disks 33 and 34 between them. A guide ring 35 is secured within chamber 29 in position to loosely surround abutment 32 and to hold a coil spring 36 in proper position in engagement with the upper surface of said abutment.

Head 21 is formed in a number of sections. Lower sections 38 and 39 are provided with flanges between which the edges of the diaphragm 30 are clamped in well known manner. Section 39 has a flanged tubular extension 40 secured to another hollow flanged section 41 forming a housing chamber for spring 36. An adjustable abutment 42, having a threaded stem 43 projecting through a threaded bore in the head 44, functions to adjust the spring pressure on the upper surface of the diaphragm. Head 44 is threaded externally to receive a sleeve 45 provided with a removable cap 46, said sleeve and cap serving to house the stem 43. As will be readily understood, upon removal of the cap 46 access may be had to a screw driver slot in stem 43 to adjust the tension of spring 36, the lock nut 43' being operated by a spanner wrench.

Arranged in conduit 10 adjacent the outlet 13 of valve 11 is a member 47 including a restriction in said conduit in the form of a butterfly valve 48 (see Figure 2). Valve 48 is secured in a slot in rod 49 provided with a square head 50 to permit ready manipulation of the valve to vary the amount of restriction of the flow in the conduit. A packing gland 51 and packing 52 serves to maintain a tight joint around rod 49.

Members 38 and 39 are bored laterally as shown at 53 and 54 in Figure 1, one of the bores communicating with the chamber on upper side of the diaphragm and the other communicating with the chamber on the lower side of the diaphragm. Bore 54 is put in communication with conduit 10 at a point 55 removed from valve 48 by connection 56 while bore 53 is connected to member 47 at a point 57 immediately adjacent the restriction in the conduit caused by the butterfly valve 48.

In operation of this form of my invention, the opposite sides of diaphragm 30 are subject to the pressure in the conduit at the points 55 and 57 on opposite sides of valve 48 so that the diaphragm moves in accordance with the difference of pressure existing at these two points. As the valve 48 may be adjusted to meet different conditions it follows that the differential pressure affecting the diaphragm may thus be varied at will by shifting the position of the valve. In order to prevent rapid fluctuation of the valve 22 under slight variations in differential pressure, small openings may be provided in connections 56 and 58. Spring 36 is provided in order to furnish a means to set the device for operation at varying differential pressures.

This feature is of importance since it is frequently necessary or desirable to make adjustments after the controller is put in operation. The provision of means to readily adjust the position of valve 48 and the flexibility of the diaphragm adapts the device for use under widely varying conditions, and is an important part of this invention.

In Figure 3 is shown in outline a modification of this invention. In this form, an orifice plate 53 is arranged in conduit 10 and the pressure on opposite sides of said plate is transmitted to opposite sides of diaphragm 30 which in this case is provided with a weight 54 equivalent to the differential pressure existing under the conditions of use of this apparatus. This device functions in the same way as that above described in detail though it lacks the capability of being readily adapted to widely varying conditions.

Figure 4 shows an arrangement adapted to regulation as well as measurement. In this view, the conduit is provided interiorly with straightening vanes 55 to give a uniform streamline flow before the fluid enters orifice plate 53. A manometer 56 of any suitable type is arranged to show the differential pressure on opposite sides of the diaphragm. If the fluid passing through conduit is a liquid, the rate of flow can be computed from the differential pressure, the size of the orifice being known. If the fluid is in a gaseous form, the pressure gauge 57 can be used to give the static pressure on the downstream side of the orifice plate. By reading the value of the gauge, a computation can be made giving accurately the volume of flow of a gas. If the pressure tends to vary, a recording pressure gauge or flow meter of any well known type can be used for computation of the rate of flow of the gas.

In Figure 5 is shown the arrangement shown in Figure 4, but including an adjustable spring 58 to adjust the diaphragm to meet different conditions of service.

Figure 6 shows a further modification in which the restriction is in the form of a butterfly valve 59 arranged on the inlet side of the controlling valve 22. This is the desirable arrangement to control the flow of gases when the inlet pressure remains constant and the outlet pressure varies.

While the invention has been above described in considerable detail it will be apparent to those skilled in the art that the details may be varied widely without departing from the spirit thereof as defined by the terms of the appended claims. Accordingly what is desired to be secured by Letters Patent and is claimed as new is:

1. A flow controller comprising a reciprocatory valve and an adjustable restriction in a conduit disposed adjacent each other, a diaphragm directly mechanically connected to said valve and adjustable with respect thereto, a coil spring arranged between said diaphragm and an adjustable abutment arranged above said diaphragm and supported by the valve casing, two bores in said casing communicating with said casing at opposite sides of said diaphragm and means connecting said bores with said conduit at spaced points adjacent said adjustable restriction.

2. A valve for a flow controller comprising a valve casing, a valve structure embodying a unitary cage containing spaced valve seats removably secured within said casing, a balanced reciprocatory valve designed to engage said seats, a head including a chamber and a tubular extension secured to said casing, a diaphragm dividing said chamber, a valve rod directly and adjustably connecting said valve and diaphragm, an abutment in said extension, means to adjust said abutment externally of said extension, a coil spring between said abutment and diaphragm, and means communicating with said chamber at opposite sides of said diaphragm and arranged to receive differing pressure from opposite sides of an adjustable restriction disposed in said conduit adjacent said valve to regulate the valve carried by said diaphragm in accordance with the difference between such pressures.

3. A flow controller comprising a valve casing having inlet and outlet stubs and arranged in a conduit, and an adjustable restriction disposed in said conduit adjacent the outlet stub of said valve, said casing including a chamber divided by a diaphragm, a balanced reciprocatory valve in said valve casing, a direct mechanical connection between said diaphragm and said reciprocatory valve, said connection being adjustable whereby the position of said valve with respect to said diaphragm may be regulated, a spring above said diaphragm, an abutment bearing upon said spring, means projecting above said casing for adjusting said abutment from the exterior thereof to thereby adjust the tension of said spring, means to normally house the projecting portion of said adjusting means, and a connection between said restriction and one side of said diaphragm chamber, and another connection between the other side of said diaphragm chamber and said outlet stub.

In testimony whereof I affix my signature.
ARTHUR J. KERR.